US011921685B2

(12) United States Patent
Downs et al.

(10) Patent No.: US 11,921,685 B2
(45) Date of Patent: *Mar. 5, 2024

(54) SYSTEM AND METHOD FOR ON-DEMAND DATA CLEANSING

(71) Applicant: Myndshft Technologies, Inc., Mesa, AZ (US)

(72) Inventors: Brian J. Downs, Scottsdale, AZ (US); John K. Moore, Phoenix, AZ (US); Antonio Iniguez, Phoenix, AZ (US)

(73) Assignee: Myndshft Technologies, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,412

(22) Filed: Nov. 30, 2022

(65) Prior Publication Data

US 2023/0086399 A1    Mar. 23, 2023

Related U.S. Application Data

(63) Continuation of application No. 16/942,663, filed on Jul. 29, 2020, now Pat. No. 11,526,477.
(Continued)

(51) Int. Cl.
*G06F 16/00* (2019.01)
*G06F 9/54* (2006.01)
(Continued)

(52) U.S. Cl.
CPC ............ *G06F 16/215* (2019.01); *G06F 9/541* (2013.01); *G06F 16/2358* (2019.01);
(Continued)

(58) Field of Classification Search
None
See application file for complete search history.

(56) References Cited

U.S. PATENT DOCUMENTS 8,385,589 B2    2/2013  Erol
8,762,406 B2    6/2014  Ho
(Continued)

OTHER PUBLICATIONS

Timothy F. Cootes, Gareth J. Edwards, and Christopher J. Taylor, "Active Appearance Models", IEEE Transactions on Pattern Analysis and Machine Intelligence, vol. 23, No. 6, Jun. 2001. (Year: 2001).

*Primary Examiner* — Hasanul Mobin
(74) *Attorney, Agent, or Firm* — BOOTH UDALL FULLER, PLC; Bryce W. Burnham; Stephen A. Merrill

(57) ABSTRACT

A system and method for on-demand data cleansing is disclosed. The system includes a processor and a volatile memory including a data object having a plurality of data fields, each field having a tag and a value. The system also includes a cleansing module stored in the volatile memory and executed by the processor. The cleansing module includes a library having a plurality of tag-operation pairs. The cleansing module is configured to receive a pointer locating the data object within volatile memory, and further configured to, for each data field, look up the tag of the data field among the library tags, and execute the operation paired with the matching library tag on the value of the field, modifying the value of the data field while it is stored in volatile memory. The cleansing module is configured to execute the operation in near real-time, and at runtime.

20 Claims, 5 Drawing Sheets

Related U.S. Application Data

(60) Provisional application No. 62/880,651, filed on Jul. 31, 2019.

(51) Int. Cl.
    *G06F 16/215*     (2019.01)
    *G06F 16/23*     (2019.01)
    *G06F 16/29*     (2019.01)
    *G06V 40/16*     (2022.01)
    *H04L 9/06*     (2006.01)
    *H04L 9/00*     (2022.01)

(52) U.S. Cl.
    CPC ............ *G06F 16/29* (2019.01); *G06V 40/161* (2022.01); *H04L 9/0643* (2013.01); *H04L 9/50* (2022.05)

(56) References Cited

U.S. PATENT DOCUMENTS

| | | | | |
|---|---|---|---|---|
| 8,997,248 | B1 * | 3/2015 | McKay | G06F 21/62 |
| | | | | 726/27 |
| 9,430,114 | B1 * | 8/2016 | Dingman | G06F 16/25 |
| 10,790,056 | B1 * | 9/2020 | Accomazzi | H04L 67/1095 |
| 11,663,204 | B1 * | 5/2023 | Moore | G06N 5/025 |
| | | | | 707/737 |
| 2002/0049749 | A1 * | 4/2002 | Helgeson | H04L 67/02 |
| | | | | 707/999.003 |
| 2005/0228808 | A1 | 10/2005 | Mamou | |
| 2008/0250057 | A1 | 10/2008 | Rothstein | |
| 2008/0288862 | A1 | 11/2008 | Smetters | |
| 2010/0212017 | A1 * | 8/2010 | Li | H04L 9/3236 |
| | | | | 726/26 |
| 2013/0024371 | A1 * | 1/2013 | Hariramani | G06Q 20/384 |
| | | | | 705/41 |
| 2013/0142426 | A1 | 6/2013 | Kaneda | |
| 2013/0346302 | A1 | 12/2013 | Purves | |
| 2014/0089782 | A1 | 3/2014 | Cook | |
| 2014/0142982 | A1 * | 5/2014 | Janssens | G16H 30/20 |
| | | | | 705/3 |
| 2015/0200958 | A1 * | 7/2015 | Muppidi | H04L 63/20 |
| | | | | 726/23 |
| 2016/0363458 | A1 | 12/2016 | Guo | |
| 2018/0012106 | A1 | 1/2018 | Cox | |
| 2018/0052891 | A1 | 2/2018 | Shuster | |
| 2018/0082024 | A1 * | 3/2018 | Curbera | G06F 21/00 |
| 2018/0174260 | A1 | 6/2018 | Cui | |
| 2018/0307859 | A1 * | 10/2018 | LaFever | H04L 63/20 |
| 2019/0235455 | A1 | 8/2019 | Michals | |
| 2019/0320898 | A1 | 10/2019 | Dirghangi | |
| 2021/0034585 | A1 * | 2/2021 | Downs | G06F 16/2358 |
| 2023/0086399 | A1 * | 3/2023 | Downs | G06F 9/541 |

\* cited by examiner

SYSTEM AND METHOD FOR ON-DEMAND DATA CLEANSING

RELATED APPLICATIONS

This application is a continuation of U.S. utility patent application Ser. No. 16/942,663, filed Jul. 29, 2020, titled "System and Method for On-Demand Data Cleansing," which claims the benefit of U.S. provisional patent application 62/880,651, filed Jul. 31, 2019, titled "System and Method for On-Demand Data Cleansing," the entirety of the disclosures of which are hereby incorporated by this reference.

TECHNICAL FIELD

Aspects of this document relate generally to data cleansing and redaction.

BACKGROUND

Advances in technologies such as machine learning and artificial intelligence have made data more valuable than ever. This increased value has been accompanied by an increase in the amount of data being captured and stored. The benefits available from collecting and analyzing this data, particularly sensitive data, are unfortunately accompanied by increased opportunity for abuse. Efforts have been made to mandate the protection of particularly sensitive information, such as health related data. For example, the Health Insurance Portability and Accountability Act of 1996 (HIPAA) dictates how sensitive data such as personally identifiable information (PII) and protected health information (PHI) is to be handled, what portion of that data can be shared, and who it can be shared with. Similarly, General Data Protection Regulation (GDPR) in the European Union (EU) dictates how sensitive data may be used, handled, or both, in the EU.

Compliance with regulations such as HIPAA and GDPR, as well as a growing uneasiness in the public regarding the sharing and use of personal information, stands as a barrier that slows and sometimes completely halts the beneficial use of the collected data. Having to redact portions of records before sharing them increases the cost of creating models and performing research, and also increases the overhead for monetization of the information.

SUMMARY

According to an aspect, a system for on-demand data cleansing, may comprise a processor, and a volatile memory communicatively coupled to the processor and comprising a data object having a plurality of data fields, each field having a tag and a value. A cleansing module may be stored in the volatile memory and executed by the processor. The cleansing module may comprise a library having a plurality of tag-operation pairs, each tag-operation pair comprising a library tag and an associated operation, the cleansing module configured to receive a pointer locating the data object within volatile memory. Each data field of the plurality of data fields may be further configured to: look up the tag of the data field among the library tags of the plurality of tag-operation pairs of the library, and execute the operation paired with the matching library tag on the value of the data field, modifying the value of the data field while it is stored in volatile memory. For each tag-operation pair of the library, the operation may define logic whose execution will bring information described by the paired library tag into compliance with a policy. The cleansing module may be configured to execute the operation by evaluating, at runtime, a string defining operation logic and stored in the tag-operation pair. The looking up of the tag within the library, and the executing of the operation may be performed in near real-time.

The system for on-demand data cleansing may further comprise one or more features, such as wherein executing the operation on the value of the data field comprises one of overwriting at least some of the value within the volatile memory and replacing the value within the data object with a reformatted value. Executing the operation on the value of the data field may comprise: generating a new value based upon the value yet having less specificity, and replacing the value with the new value within the data object stored in volatile memory. The value may comprise an image, and generating the new value based upon the value may comprise using machine vision to detect any faces within the image, and generating a new image having all detected faces obscured. The value may comprise a geolocation, and generating the new value based upon the value may comprise resolving the geolocation within a geographic information system and generating a geographic descriptor of lesser specificity than the geolocation. A network interface may be communicatively coupled to the processor and a network, an API may be configured to receive instructions through the network interface, wherein the API may be configured to receive a new tag-operation pair through the network interface, and the new tag-operation pair may be stored within the library. The API may be further configured to receive the data object through the network interface, store the data object in the volatile memory, and pass the pointer locating the data object within the volatile memory to the cleansing module. The cleansing module may be further configured to select one library from a plurality of libraries, each library implementing a different policy.

According to another aspect, a system for on-demand data cleansing, may comprise receiving a pointer locating a data object within a volatile memory, the data object comprising a plurality of data fields, each data field having a tag and a value. For each data field of the plurality of data fields of the data object, the following may occur: looking up the tag of the data field within a library stored in the volatile memory, the library comprising a plurality of tag-operation pairs each having a library tag and an associated operation; finding the tag-operation pair having a matching library tag; and executing the operation stored in the library and paired with the matching library tag on the value of the data field, and modifying the value of the data field while the value is stored in volatile memory. For each tag-operation pair of the library, the operation may define logic whose execution brings information described by the paired library tag into compliance with a policy.

The system for on-demand data cleansing may further comprise one or more of the following. Wherein the executing the operation comprises evaluating, at runtime, a string defining operation logic and stored in the tag-operation pair. Wherein the looking up of the tag within the library, the finding of the tag-operation pair, and the executing of the operation is performed in near real-time. Wherein executing the operation on the value of the data field comprises one of overwriting at least some of the value within the volatile memory and replacing the value within the data object with a reformatted value. Wherein executing the operation on the value of the data field comprises generating a new value based upon the value yet having less specificity, and replacing the value with the new value within the data object stored in volatile memory. Wherein the value comprises an image, and wherein generating the new value based upon the value comprises using machine vision to detect any faces within the image, and generating a new image having all detected faces obscured. Wherein the value comprises a geolocation, and wherein generating the new value based upon the value comprises resolving the geolocation within a geographic information system and determining a geographic descriptor of lesser specificity than the geolocation. The system may further comprise receiving a new tag-operation pair through an API, and storing the new tag-operation pair within the library. The system may further comprise receiving the data object through an API and storing the data object in the volatile memory, wherein the pointer is received in response to the data object being received through the API. The policy may be HIPAA. The system may further comprise selecting one library from a plurality of libraries, each library implementing a different policy.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
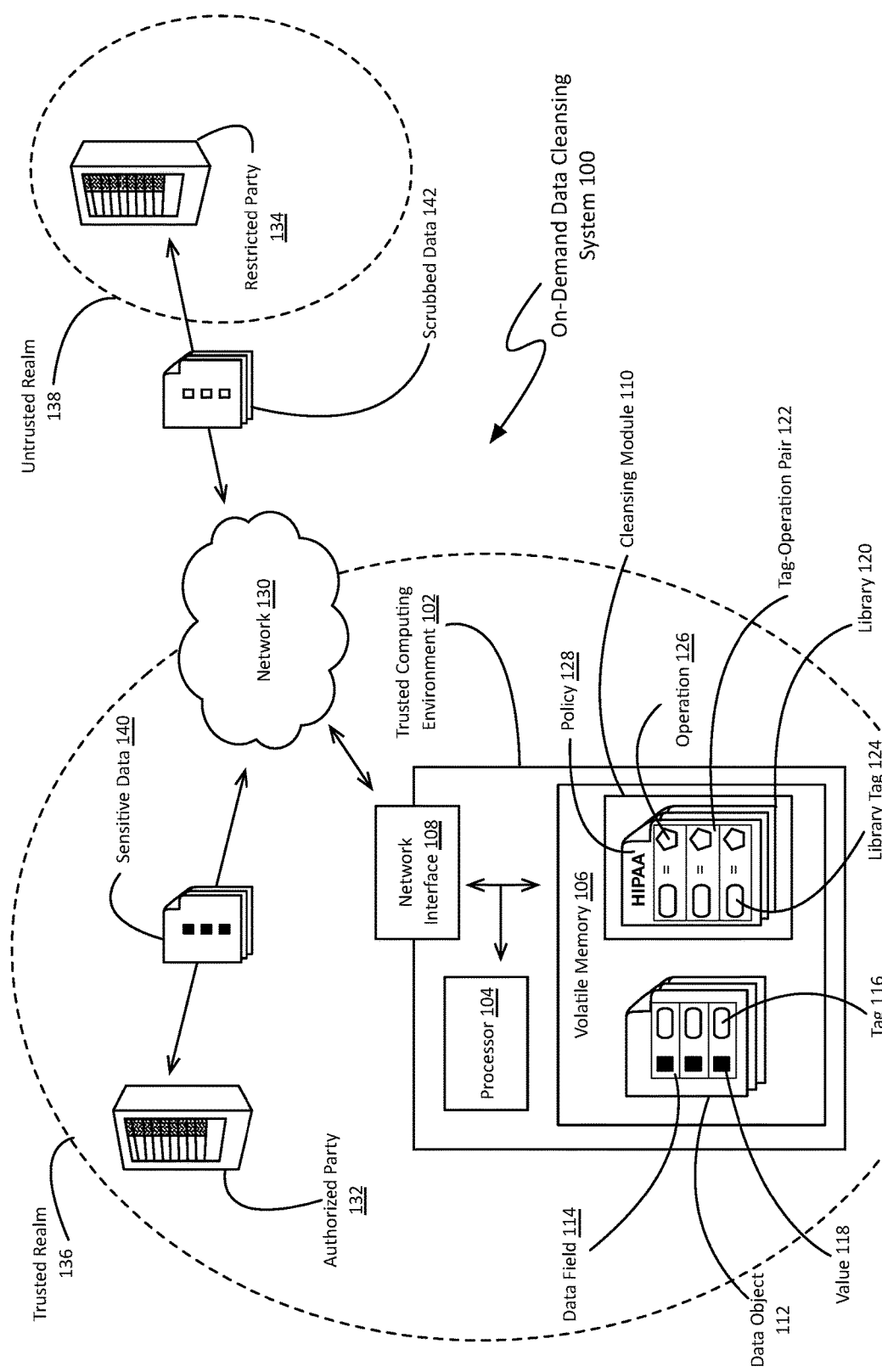
FIG. 1 is a schematic view of an on-demand data cleansing system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Advances in technologies such as machine learning and artificial intelligence have made data more valuable than ever. This increased value has been accompanied by an increase in the amount of data being captured and stored. The benefits available from collecting and analyzing this data, particularly sensitive data, are unfortunately accompanied by increased opportunity for abuse. Efforts have been made to mandate the protection of particularly sensitive information, such as health related data. For example, HIPAA dictates how sensitive data such as personally identifiable information (PII) and protected health information (PHI) is to be handled, what portion of that data can be shared, and who it can be shared with.

Compliance with regulations such as HIPAA and GDPR, as well as a growing uneasiness in the public regarding the sharing and use of personal information, stands as a barrier that slows and sometimes completely halts the beneficial use of the collected data. Having to redact portions of records before sharing them increases the cost of creating models and performing research, and also increases the overhead for monetization of the information. For ease of description, instances in which HIPAA is referenced, a person of ordinary skill in the art (POSA) will appreciate that HIPPA is being used both for HIPAA per se, and as a placeholder for GDPR or any other classification or designation of sensitive information.

Contemplated herein is a system and method for on-demand data cleansing, providing a nimble process for modifying, refining, cleansing, or scrubbing data so it may be shared and used by parties whose purpose and/or method of access would otherwise be inappropriate or even illegal. The on-demand data cleansing system, hereinafter referred to as a cleansing system (and known by the trademark name Srub™), receives data object(s) whose fields have been tagged or labeled, and performs various operations on the value of each data field based upon a tag and a corresponding operation in a library. According to various embodiments, these operations are evaluated at runtime, and are performed directly on the data as it exists in the volatile memory of a trusted computing environment, providing flexibility, efficiency, and security. The cleansing system may be quickly modified to adapt to regulatory or other changes, without having to reprocess a large body of data.

The systems and methods for on-demand data cleansing contemplated herein is advantageous over conventional methods of redacting sensitive information for a number of reasons. By operating on the data as it exists in volatile memory within a trusted computing environment, high throughput streaming of clean, sharable data is possible, without risking the creation of a vulnerable surface area. Additionally, the ability to provide real-time or near real-time cleansed information provides new opportunities for research and oversight. For example, by providing a high throughput stream of cleansed, HIPAA-compliant clinical and billing information, regulatory and research organizations may observe changes in population health, as well as detect and address problems sooner, minimizing their negative effect. The cleansing system and method contemplated herein may facilitate the application of modern data science methodologies, such as the creation of predictive models, and may also open up new revenue streams otherwise not feasible due to the speed and cost of conventional redaction systems and methods.

Many of the non-limiting examples of how the cleansing system and method may be applied deal with redacting sensitive medical information. However, it should be noted that the systems and methods contemplated herein may be applied to a wide range of other industries and data types, including but not limited to financial records (e.g. bank statements, tax returns, etc.), proprietary research data, and the like. Additionally, the contemplated systems and methods may also be applied to the obfuscation of data that is not necessarily sensitive (i.e. it does not pose potential harm in its exposure), but may be beneficially obfuscated for other reasons. As a specific example, some embodiments of the contemplated system may be employed by an entity who makes varying grades of information available to consumers who have the option pay a higher price for greater precision. The systems and methods contemplated herein may be used to provide said data in real-time or near real-time, as a high throughput stream, at various degrees of obfuscation. Exemplary data includes but is not limited to satellite imagery, weather data, location tracking data, industry and financial market data, and the like.

FIG. 1 is a schematic view of a non-limiting example of an on-demand data cleansing system 100. As shown, the cleansing system 100 comprises an on-demand data cleansing module 110 implemented within an exemplary trusted computing environment 102. FIG. 1 depicts the trusted computing environment 102 in the context of physical hardware. According to various embodiments, the trusted computing environment 102 comprises a processor 104 communicatively coupled to a volatile memory 106 and a network interface 108.

In the context of the present description, a trusted computing environment 102 refers to a computing environment that is under the control, or whose security and access is under the control, of a party authorized to have access to sensitive data 140. In other words, an environment within which compliance with a data privacy policy may be ensured by the user, by defining and overseeing general security and policy regarding access and transmission of data. In some embodiments, this trusted computing environment 102 may be embodied in a single machine, in others it may comprise a plurality of localized machines communicatively coupled through a secure network, and in still other embodiments, the trusted computing environment 102 may be implemented in a distributed manner, such as a cloud computing platform.

It should be noted that much of the following discussion will be in the context of cleansing data to conform with a data privacy policy or law, such as HIPAA. Those skilled in the art will recognize that the systems and methods contemplated herein may be applied to enforce a policy on data that is not related to privacy. In this broader context, a trusted computing environment 102 may be thought of as an environment overseen by a party authorized to have access to unmodified or raw data objects, which in turn are modified, redacted, obfuscated, enhanced, augmented, amended, and/or converted in anticipation for a specific use.

As shown, an on-demand data cleansing module 110 (hereinafter cleansing module 110 or module 110) is stored in the volatile memory of the trusted computing environment 102 (hereinafter computing environment 102 or environment 102). According to various embodiments, the module 110 is stored in the volatile memory 106 and executed by the processor 104.

The cleansing module 110 operates on sensitive data that has been stored in a volatile memory 106 as a data object 112. According to various embodiments, the cleansing module 110 operates on a data object 112 stored in volatile memory. In some embodiments, the cleansing module 110 may also operate on data in non-volatile memory (not shown), creating a scrubbed copy of the sensitive data. In the context of the present description, a data object 112 is a structured collection of data, having one or more data fields 114 containing some form of information as a value 118. As shown, each data field 114 in the data object 112 also has an associated tag 116. In some embodiments, each data object 112 may comprise the associated tags 116 while in volatile memory 106, while the field/tag pairs may be specified once (e.g. part of a database schema, etc.) in non-volatile storage.

According to various embodiments, a tag 116 is a key or value data type, and acts as a label or an identifier describing the nature of a data field 114 within a data object 112. A tag is also tied to an operation 126 relevant to that particular field 114, through a library 120. In some embodiments, the tag 116 may be stored as a string value. Some embodiments of the cleansing module 110 may be implemented using a language to which field tags are inherent, such as Go. Other embodiments may implement the tagging of fields 114 by the definition of data structures pairing each field 114 with a tag 116 (e.g. a string). Tags will be discussed in greater detail with respect to FIG. 4, below.

As shown, the cleansing module 110 comprises at least one library 120. In the context of the present description, a library 120 is a collection of tag/operation pairs 122, associating each library tag 124 with operations 126 meant to implement a privacy policy 128, such as ensuring compliance with regulation such as HIPAA, for the type of information particular to that field (e.g. age, social security number, etc.). According to various embodiments, the cleansing module 110 may comprise a default library 120 having a predefined set of tag/operation pairs 122. In some embodiments, the module 110 may comprise a plurality of libraries 120.

It should be noted that while the tags of the library 120 are hereinafter referred to library tags 124, they are the same as the tags 116 given to data fields 114 in a data object 112. The different names is simply to facilitate the following discussion of how various embodiments of the contemplated systems and methods operate, and are not intended to imply or require any sort of structural difference, apart from where they reside (i.e. data object 112 vs. library 120).

In the context of the present disclosure and the claims that follow, an operation 126 is the logic that is executed to perform the cleansing of a particular field type, or to bring the value 118 (i.e. information, content, etc.) within that field 114 into compliance with regulation or policy. Operations 126 will be discussed in greater detail with respect to FIG. 4, below.

According to various embodiments, the cleansing of a data object 112 having sensitive data is initiated when the active location of the data object 112 within the volatile memory 106 (e.g. a pointer) is passed to the cleansing module 110. For each field 114, the cleansing module 110 matches the fields tag 116 with a library tag 124, and then performs the operation 126 associated with that library tag 124 on the value 118 within the field 114. The operation of the cleansing module 110 will be discussed in greater detail with respect to FIG. 3, below.

According to various embodiments, the on-demand data cleansing module 110 may comprise more than one library 120, meaning the tag/operation pairs 122 may be organized in more than one collection. While many of the examples provided herein are focused on the cleansing of sensitive data within a healthcare context (e.g. HIPAA, etc.), the cleansing module 110 may be adapted for cleansing sensitive data 140 gathered and used in a variety of other jurisdictions or industries, making it sharable without compromising privacy or violating the law. For example, one embodiment of the cleansing module 110 may comprise a library 120 for HIPAA compliance, and another library 120 for compliance with the General Data Protection Regulation (GDPR) of the EU.

In addition to health data, the cleansing module 110 may be configured to operate on other sensitive or personally identifying information, including financial (e.g. banking information, credit card information, transactional details, etc.), commercial (e.g. purchase history, etc.), personal activity (e.g. metadata from email, phone, and text communications, GPS location history, interactions between personal devices and network nodes, etc.), demographic, legal, regulated data (e.g. SOX, HIPAA, GDPR, GLBA, etc.), and the like.

According to various embodiments, the trusted computing environment 102 exist within a trusted realm 136, and may interact with parties in one or more untrusted realms 138. In the context of the present description, a trusted realm 136 is an organizational concept that describes a collection of entities and associated infrastructure having a shared level of access, responsibility, and/or control over sensitive data 140, meaning ability to abide by and enforce one or more policies or regulations regarding the use and transmission of said data. All parties within the trusted realm 136 (i.e. authorized parties 132) implement the necessary security to protect sensitive data, and all of those parties are authorized to access the sensitive data without redaction, according to various embodiments.

Conversely, an untrusted realm 138 is made up of restricted parties 134 that are not authorized to fully access the sensitive data 140, or parties 134 that employ communication channels that do not rise to the level of security specified by policy or regulation. Information passed into an untrusted realm 138 is no longer in the control of a trusted entity. Any sensitive data 140 must be cleansed before being sent into an untrusted realm 138 as scrubbed data 142.

In some embodiments, realms may coincide with communication constructs, such as networks. For example, in one embodiment, the trusted realm 136 and the untrusted realm 138 may be blockchain networks, each isolated from each other and allowing communication backed by an immutable ledger. In some embodiments, a trusted realm 136 and an untrusted realm 138 may be technologically identical, making using of the same communication protocols and security standards, the only difference being the allowed level of access to the sensitive data (i.e. trusted realm has full access, untrusted realm has restricted access defined by regulation or policy).

In some embodiments, realms may coincide with physical partitions. For example, in one embodiment, the trusted realm 136 may be limited to the trusted computing environment 102, and all machines outside of that trusted realm 136 may be considered to be in an untrusted realm 138. As shown, the trusted computing environment 102 comprises a network interface 108 communicatively coupled to a plurality of authorized 132 and restricted 134 parties through a network 130.

It should be noted that the division of trusted 136 and untrusted 138 realms does not necessarily fall in line with organization partitions. An organization or entity may have trusted and untrusted portions. For example, in one embodiment, the entity in control of the trusted computing environment 102 may comprise elements, departments, or divisions, that would be considered to be in an untrusted realm 138, because their access to the sensitive data 140 would be inappropriate, even though they may be affiliated with the trusted entity. As a specific example, data may need to be cleansed before being passed to an in-house data science group for model development.

As previously mentioned, the trusted computing environment 102 itself may be abstracted, making use of virtual machines or containers, as is known in the art. Containers are advantageous, as their lack of operating system makes them more efficient than virtual machines, while still providing the same isolated environment. The use of an abstracted execution environment further facilitates the provisioning of highly available containers (e.g. deployment on multiple machines or clouds for fail-over, etc.). Since the containers are known commodities, if one fails, crashes, or otherwise misbehaves, it can quickly be replaced with a newly instantiated copy of the same container, or a rolled back version of the container. This speed and availability may be employed to great effect by the system and method contemplated herein, more so than conventional data redaction methods. The speed of the cleansing system 100 will be discussed in greater detail with respect to FIG. 3, below.

The use of containers for the creation of a trusted computing environment 102 is advantageous over conventional methods for creating application-specific computing environments, as they can be hardware agnostic. In many conventional systems, upgrading to new or updated hardware may require a great deal of work (and expense), often resulting in systems getting locked into aging hardware. Building an environment using containers means that only the container execution framework needs to be updated to take advantage of new or different hardware.

Figure 2:
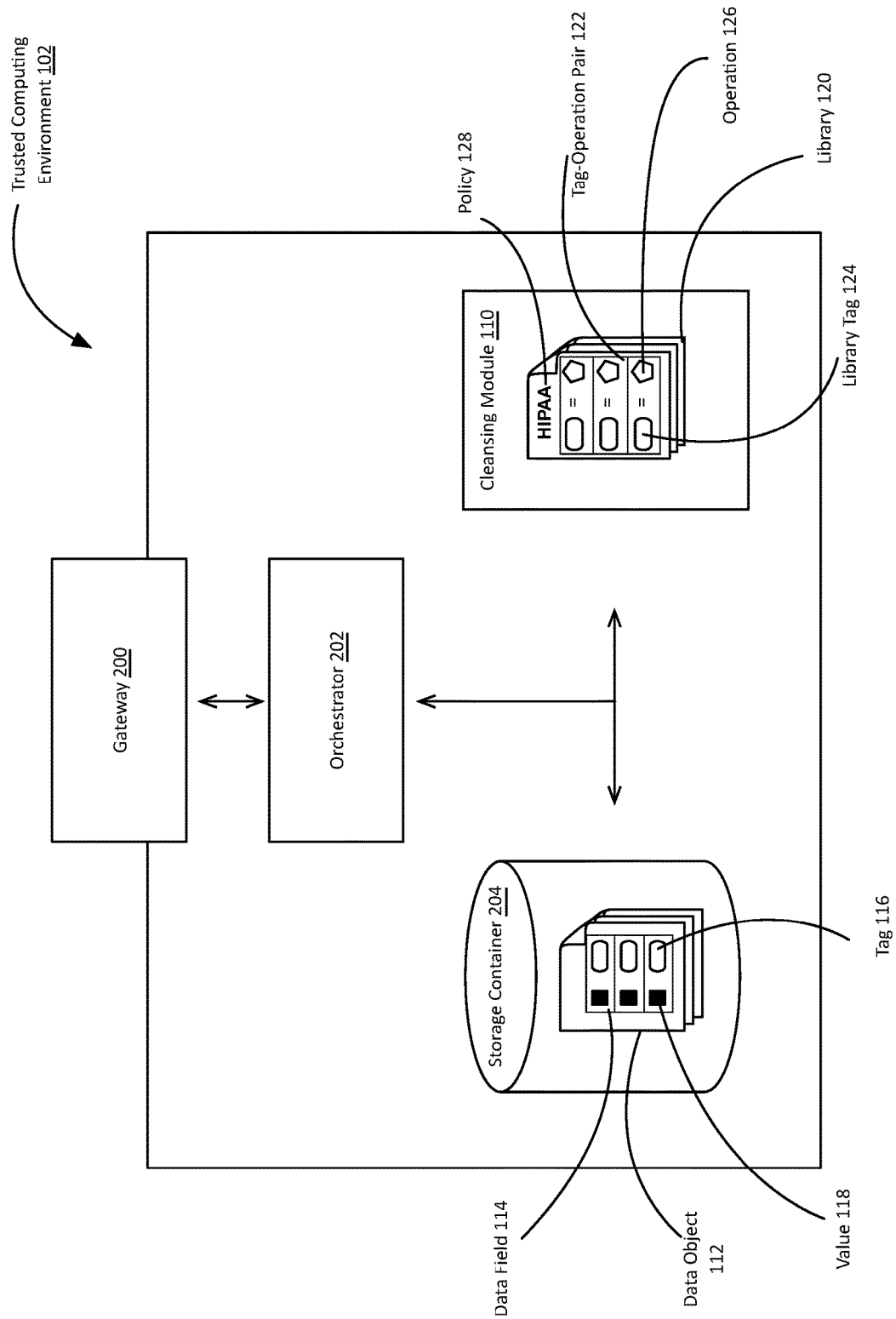
FIG. 2 is a schematic view of a trusted computing environment, abstracted.

FIG. 2 is a schematic view of a non-limiting example of a trusted computing environment 102, abstracted as a container-based environment. The non-limiting example of a trusted computing environment 102 shown in FIG. 2 makes use of a containerized or virtualized architecture, having a gateway 200 that serves as the portal between the trusted computing environment 102 and other devices, and an orchestrator 202, which oversees the operation of the environment and issues instructions to its various components.

This is provided as an exemplary environment; the implementation of the system and method of on-demand data cleansing contemplated herein is not limited to such an environment. While in some embodiments the cleansing module 110 may be a container within a virtualized system or cluster, in other embodiments it may operate as standalone application, or even a function or package called by program as part of a cleansing routine. Those skilled in the art will recognize that the cleansing module 110 contemplated herein may be implemented in a variety of environments beyond the simplified containerized environment shown in FIG. 2.

According to various embodiments, an API Gateway container 200 (hereinafter gateway 200) is standard point of input for the trusted computing environment 102, and stands between the Orchestrator container 202 and the world. It may be used to allow external access to the orchestrator 202 or the cleansing module 110. For example, in some embodiments, a client device 222 may be able to interact with the module 110 solely through the API gateway 200. In some embodiments, the API Gateway container 200 is the only container with an externally addressable IP address.

In the context of the present description, an Orchestrator container 202 (also referred to as the orchestrator 202) is a container configured to carry out the intended purpose or purposes of the trusted computing environment 102 by receiving inputs, detecting trigger events (e.g. data requests, library updates, regulatory changes, compliance violations, etc.), and tasking one or more containers within the environment 102 to perform specific tasks. Data received at the API Gateway container 200 from a data source (e.g. authorized party 132, etc.) are passed on to the Orchestrator 202. In some embodiments, the Orchestrator container 202 serves to validate the incoming data, in addition to determining which actions need to be taken, such as passing a pointer to individual data objects within the storage container 204 (implemented using volatile memory 106) along to the cleansing module 110. According to various embodiments, the Orchestrator container 202 may be configured such that tasks may be carried out asynchronously.

Figure 3:
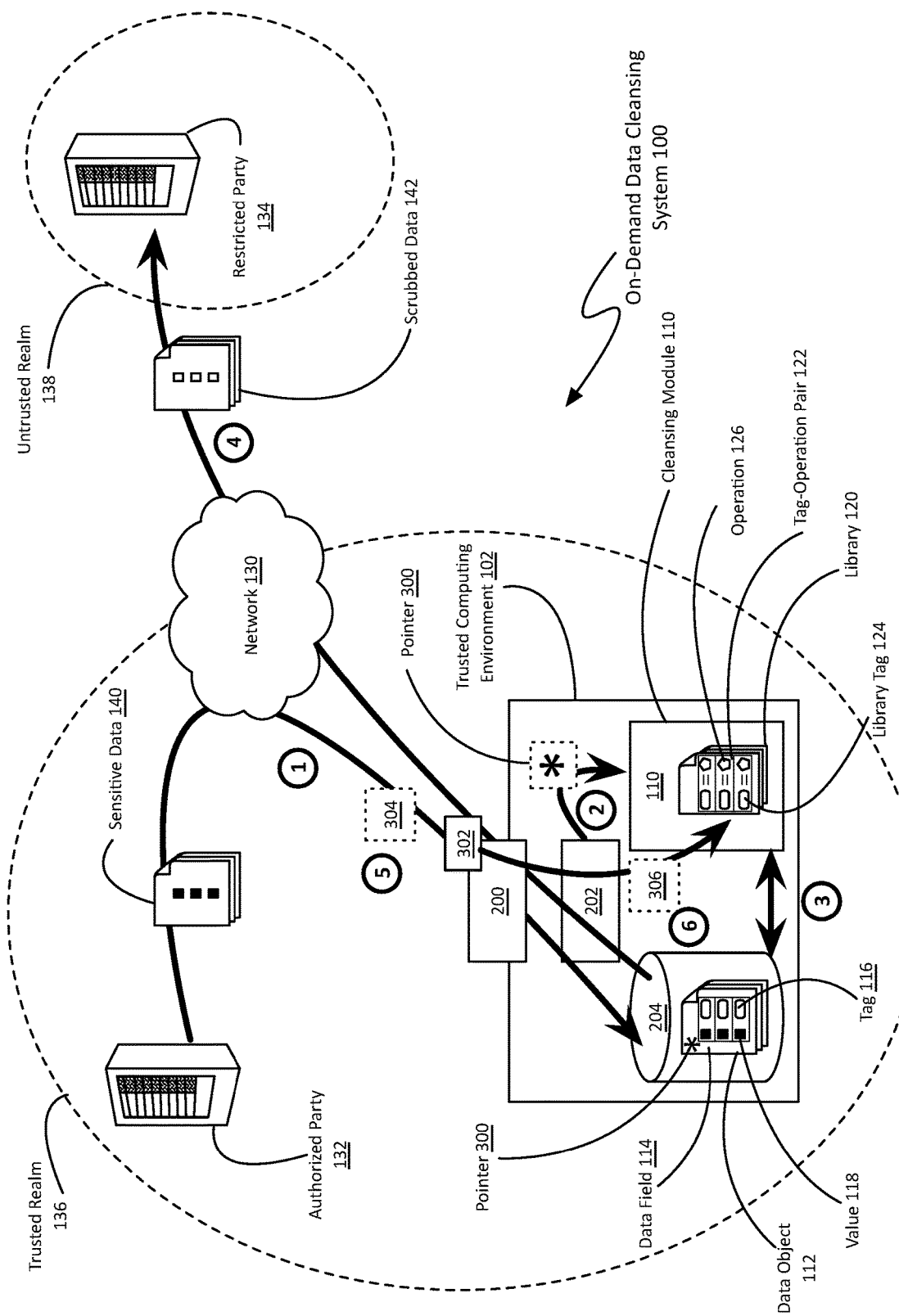
FIG. 3 is a process view of an on-demand data cleansing system.

FIG. 3 is a process view of a non-limiting example of data cleansing performed by a cleansing module 110 implemented in a trusted computing environment 102 within an on-demand data cleansing system 100. It should be noted that the computing environment 102 is shown in the non-limiting example of the container-based abstraction discussed with respect to FIG. 2. This allows for a more meaningful discussion of various elements that, in execution, may all reside in the same volatile memory, but are here able to be depicted as various abstract objects or containers within the computing environment 102.

As shown, the trusted computing environment 102 is interacting with parties within trusted 136 and untrusted 138 realms. Obtaining the greatest benefit, both in terms of revenue as well as quality and type of services provided, from data sometimes requires the participation of other parties, and sometimes those parties are not authorized to access the raw data or are outside of a sphere of control or on the other side of insecure links. The on-demand data cleansing module 110 contemplated herein facilitates the rapid and flexible preparation of sensitive data 140 to be shared with these parties 134 as scrubbed data 142, without violating policies or regulations.

FIG. 3 may be used to illustrate a non-limiting example of a use case. Sensitive data 140 may be received at the trusted computing environment 102 from an authorized party 132 (e.g. a pharmacy, etc.) within the trusted realm 136. See circle '1'. In some embodiments, this data may be received through an API 302. As shown, the sensitive data 140 is received at the gateway 200, passed to the orchestrator 202 and placed in volatile memory 106 (as represented by the storage container 204). In some embodiments, the trusted computing environment 102 may receive sensitive data 140 from a source with field tags 116 already in place, while in other embodiments, the field tags 116 may be attached to the sensitive data objects after transmission, resulting in a tagged data object 112 residing in volatile memory 106. In some embodiments, tags 116 may be assigned to the data object 112 by the gateway 200 as part of data validation, in others the tagging may be done by, or on orders from, the orchestrator 202. In still other embodiments, the cleansing module 110 may be called upon to add tags 116 to a set of untagged data. In other embodiments, the tagging may be performed by another routine, object, or container within the trusted computing environment 102. In embodiments where the application of tags 116 is not performed at the source, the tagging may be performed using data identifiers (e.g. this field is formatted as a date, etc.), a known data format (e.g. the second field is always a first name, etc.), artificial intelligence, and/or any other data type identification methods known in the art.

Along with the sensitive data 140, the pharmacy (i.e. authorized party 132) requests an eligibility check, or some other service or operation offered by the trusted computing environment 102, be performed based on the sensitive data 140. The nature of the eligibility check and the steps involved are outside the scope of the present disclosure; it is simply an example of the back and forth of sensitive information between the trusted computing environment 102 and an authorized party 132.

At the same time, the entity operating the trusted computing environment 102 has contracted to share data with a research group investigating trends in opiate use. This group is not allowed access to all the data received from the pharmacy due to HIPAA constraints, so the data must be cleansed. When the raw data object 112 is no longer needed (e.g. eligibility check has been completed, etc.), the orchestrator 202 passes a pointer 300 to the data objects 112 location within volatile memory 106 to the cleansing module 110. See circle '2'.

Thereafter, the cleansing module 110 looks at the tag 116 linked to each field 114 in the data object 112, looks it up in a library 120, and executes the operation 126 found in the library 120 corresponding to the tag 116 on the value 118 in the field 114. See circle '3'. According to various embodiments, these operations are evaluated at runtime, and thus could be changed without recompiling or disrupting the cleansing module 110. Additionally, the operations are performed on the data objects while they are still stored in volatile memory. The result of executing the operations 126 is a data object 112 that has been sanitized of information that would violate HIPAA.

The scrubbed data 142 is then sent to the research group (i.e. restricted party 134 in the untrusted realm 138) through the gateway 200 or another outbound channel. See circle '4'. In some embodiments, the looking up of the tag within the library, the finding of a matching tag-operation pair, and the executing of the operation is performed as a high throughput stream, providing real-time or near real-time sources of privacy-protecting information to researchers, regulator bodies, commercial interests, and the like, without storing multiple copies of sensitive data or additional risk of exposure. The high throughput stream, providing real-time or near real-time results, can be, for example, on the order of 1-10 microseconds (μs) or about 5,000 nano seconds (ns) per operation. As used herein the term "about" means the stated number or value as well as a percent difference from the stated number or value of less than or equal to 50%, 40%, 30%, 20%, 10%, or 5%. In other words, the high throughput stream providing real-time or near real-time results may filter or scrub approximately 100,000-500,000 scrub operations per second, or about 250,000 "scrub" operations performed in, or about, 1.3 seconds, such as when run (at the time of this writing) on a standard laptop computer for a record comprising relatively simple data such as patient demographic data, patient provider's information, and patient insurance information. This great speed advantage is made possible, at least in part, by operating on the data while it is in volatile memory. A person of ordinary skill will appreciate that as general computer hardware improves, corresponding improvements in processing time will also result.

According to various embodiments, the computing environment 102 comprises an API 302 that is configured to receive instructions 304, sensitive data 140, and the like. In some embodiments, these communications are received by the API 302 through the network interface 108 shown in FIG. 1, while in other embodiments, said communications may be performed other some other communication channel.

Advantageous over other data redaction systems, the API 302 of the cleansing system 100 permits the creation of custom libraries specific to a particular need, according to various embodiments. First, the API 302 receives an instruction 304 from a party that is authorized to define new tag-operation pairs 306 for a library. See circle '5'. According to various embodiments, the instruction 304 may comprise a new tag and a new operation, or it may point to an existing library, or tag-operation pair belonging to an existing library, and a replacement tag or replacement operation. Upon receipt of the new tag-operation pair 306, the API 302 stores it within a library 120 in the cleansing module 110. See circle '6'.

Since the cleansing is performed on-demand, and at runtime, implementation of custom libraries, or even libraries reflecting regulatory changes, is rapid. As a specific example, if HIPAA were changed to dictate that only the first two digits of a zip code may be shared, rather than three, that change could be implemented simply by modifying the operation 126 associated with the "zip" tag 124 in a library, and pointing to that library 120 when the HIPAA change is made effective.

The custom API allows a user to define the behavior of the cleansing module 110 when acting on arbitrary data, using custom tags and associated operations. In some embodiments, a custom library 120 may define new library tags 124, while in other embodiments a custom library 120 may also redefine the operation 126 associated with default or predefined library tags 124.

As another example, a user of the cleansing module 110 may wish to share data with a third party (e.g. for the creation of a model, etc.), and whose internal policies are stricter than regulatory policies in some areas. For example, a company (i.e. the user) may have promised its customers that some information would not ever be shared, even if that release would be allowed by HIPAA. The cleansing module 110 could be configured with a standard HIPAA library 120 and a custom library 120 that supersedes the default library 120 for certain types of data, ensuring that the shared data conforms to both HIPAA and the stated privacy policy of the user. In some embodiments, the libraries may be defined with an "order of operation", allowing the definition of certain tag/operation pairs that replace default pairs.

In some embodiments, the API 302 may be configured to receive data objects, such as sensitive data 140. For example, in some embodiments, the API 302 may receive a data object from another party, store it in volatile memory 106, and then pass a pointer 300 to the data object 112 on to the cleansing module 110 for processing.

As shown, in some embodiments, the cleansing module 110 may comprise a plurality of libraries 120, each implementing a different policy 128 regarding data. The library chosen may depend on a number of factors including, but not limited to, the identity of a requesting party, the identity of the data source, the nature of the data, where a data request is coming from (e.g. geolocation of an IP address, user identity of the request source, etc.), and the like. In some embodiments, the cleansing module 110 is configured to automatically select one library 120 from a plurality of libraries 120, each library implementing a different policy 128.

Figure 4:
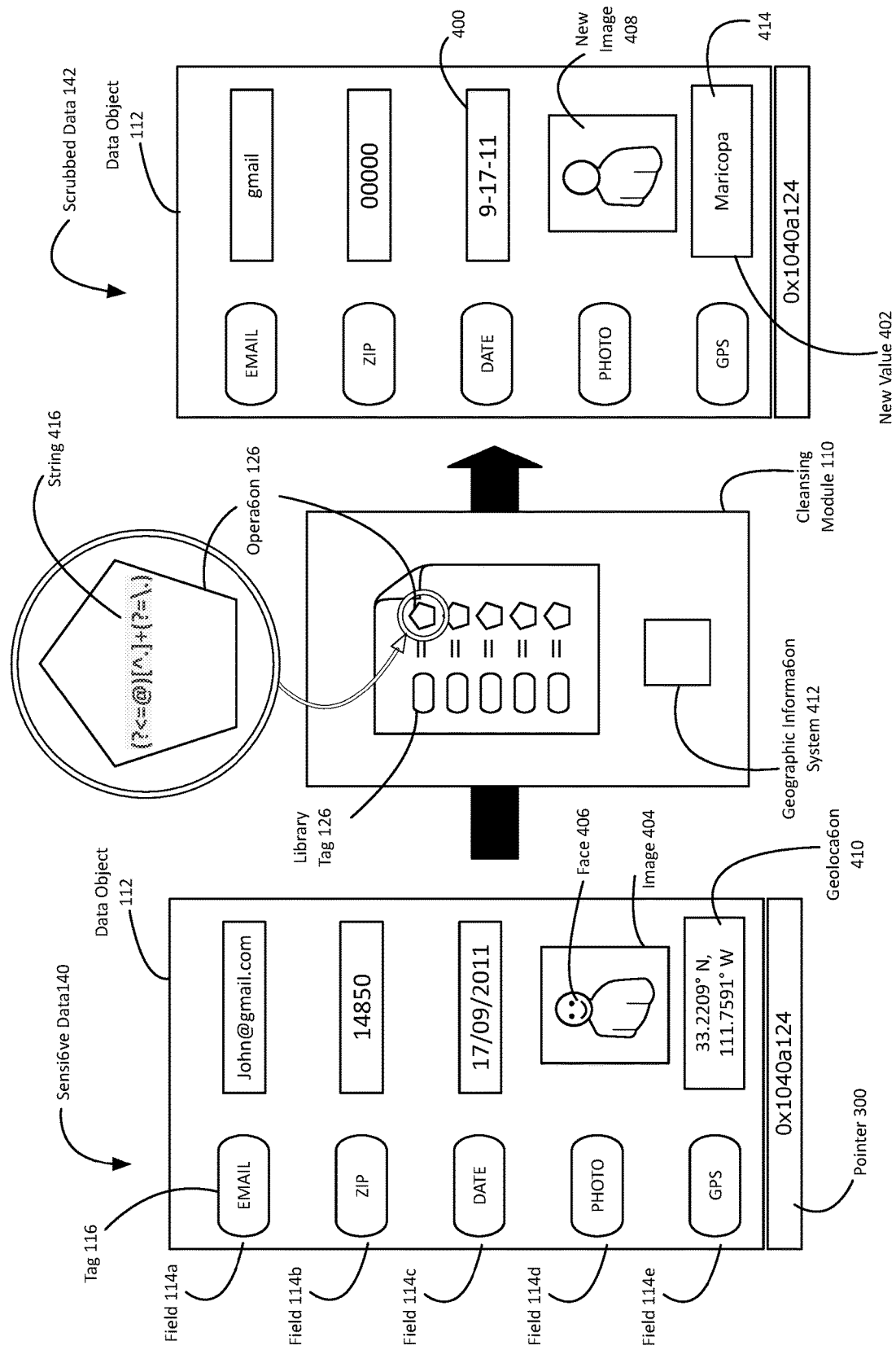
FIG. 4 is a schematic view of a data object being cleansed by an on-demand data cleansing system.

FIG. 4 is a schematic view of a non-limiting example of a data object 112 being cleansed by an on-demand data cleansing module 110 of a cleansing system 100. As shown, the data object 112 starts as sensitive data 140. The pointer 300 to the data object 112 in volatile memory 106 is passed to the cleansing module 110, which uses a library 120 to implement a policy through operations 126 performed on the data fields 114. Upon termination, the data object 112 has become scrubbed data 142, conforming to the policy on which the library 120 is based.

In some embodiments, operations 126 may be simple filters, such as regular expressions, that remove or modify portions of the field. For example, see data field 114a, where the associated operation 126 removes everything but the domain name from an email address). In other embodiments, an operation 126 may comprise logic operations that branch, treating the value 118 within a field 114 using one or more conditional statements. For example, in one embodiment, an operation 126 tied to the "state" field tag may empty the field if the field contains "Arizona", and may replace the field with "redacted" if the field contained any state other than "Arizona".

In some embodiments, the operation may overwrite at least a portion of the value 118. See, for example, field 114b, where the zip code is overwritten in the volatile memory 106 by zeros. In other embodiments, the operation 126 may replace the value 118 with a reformatted value 400. See, for example, value 114c, where a date is put into a different format that, among other things, swaps the location of the month and the day.

Exemplary tags 116 include, but are not limited to: The "standard" tag, which may be associated with an operation 126 that empties the associated field. The "initial" tag, which may be associated with an operation 126 that truncates a string to the first character. The "zip" tag, which may be associated with an operation 126 that truncates a zip code value down to the first 3 digits, unless it is one of a subset of zip codes deemed too geographically specific, which instead are set to "000". The "email" tag, which may be associated with an operation 126 that truncates the given email address to only the domain name. The "dob" tag, which may be associated with an operation 126 that truncates the date of birth value to the given year, if it conforms to HIPAA age requirements (e.g. is within a certain age range). The "gender" tag, which may be associated with an operation 126 that sets the value to "unknown". The "age" tag, which may be associated with an operation 126 that modifies an age value based on HIPAA upper boundary guidelines. It should be noted that these tags and operations are non-limiting examples.

In still other embodiments, an operation 126 may be as sophisticated as any other executable source code. For example, in one embodiment, an operation 126 may call on, pass data to, and/or retrieve data from another routine, executable, or resource.

As a specific example, in some embodiments, the cleansing module 110 may make use of machine vision to implement a privacy policy for images. For example, the sensitive data 140 may comprise a field 114d having an image 404 for a value 118. The policy requires that identities be obscured in all photos. Thus, the associated operation 126 in the library 120 uses machine vision to detect any face 406 that appears within an image 404, and then generates a new image 408 where the detected faces have been obscured or obfuscated (e.g. blurred, pixelated, etc.).

As another specific example, in some embodiments, the cleansing module 110 may employ a geographic information system (GIS) 412 to reduce the specificity of a location. As shown, a field 114e whose value 118 is a geolocation 410 gets passed into a GIS system 412 to render a geographic descriptor of lesser specificity 414. For example, a set of latitude and longitude coordinates may be obscured to the name of the county containing the coordinates. In some embodiments, the cleansing module 110 may have a GIS system self-contained and localized to the trusted computing environment 102. In other embodiments, the cleansing module 110 may harness resources outside the trusted computing environment 102 (e.g. resources operated by a third party, etc.).

In some embodiments, the operations 126 may be compiled as part of a library 120 that is static at runtime. However, in other embodiments, the cleansing module 110 may be implemented using a language that supports runtime reflection, such as Go, allowing the operations 126 to be defined as data within the library 120. This is advantageous over static libraries, allowing for the operations 126 to be defined or redefined at runtime, resulting in an agile system that can quickly adapt to changes in regulation, policy, or goal, without recompiling or significant interruption to operation. Those skilled in the art will recognize that this flexibility may be accomplished with languages supporting runtime reflection, as well as hybrid solutions that incorporate some form of scripting that evaluated at runtime rather than when the system is compiled (e.g. operations 126 defined by scripts external to the code of the cleansing module 110 itself, etc.).

According to various embodiments, the operations 126 may be stored in the library 120 in the form of a string 416. See, for example, the operation 126 associated with the redaction of an email address to just the domain name. As shown, the operation 126 is a string 416, specifically a regular expression.

It should be noted that while this disclosure is focused on the cleansing of data, or the removal of sensitive portions of data in preparation for exposure within a defined set of policies or regulations, the system and method contemplated herein may be extended to the performance of any operation on a data object in anticipation of another event or operation. As will be discussed in greater detail below, custom libraries may be defined to accomplish specific goals, even beyond the redaction or obfuscation of sensitive information. Therefore, while the cleansing system may be beneficial when used to safeguard certain data from being shared with unauthorized parties, the operations 126 defined in a library 120 are not necessarily limited to the removal, reduction, or obfuscation of information, but may also perform "augmenting" functions, including but not limited to validation, correction, and expansion.

Figure 5:
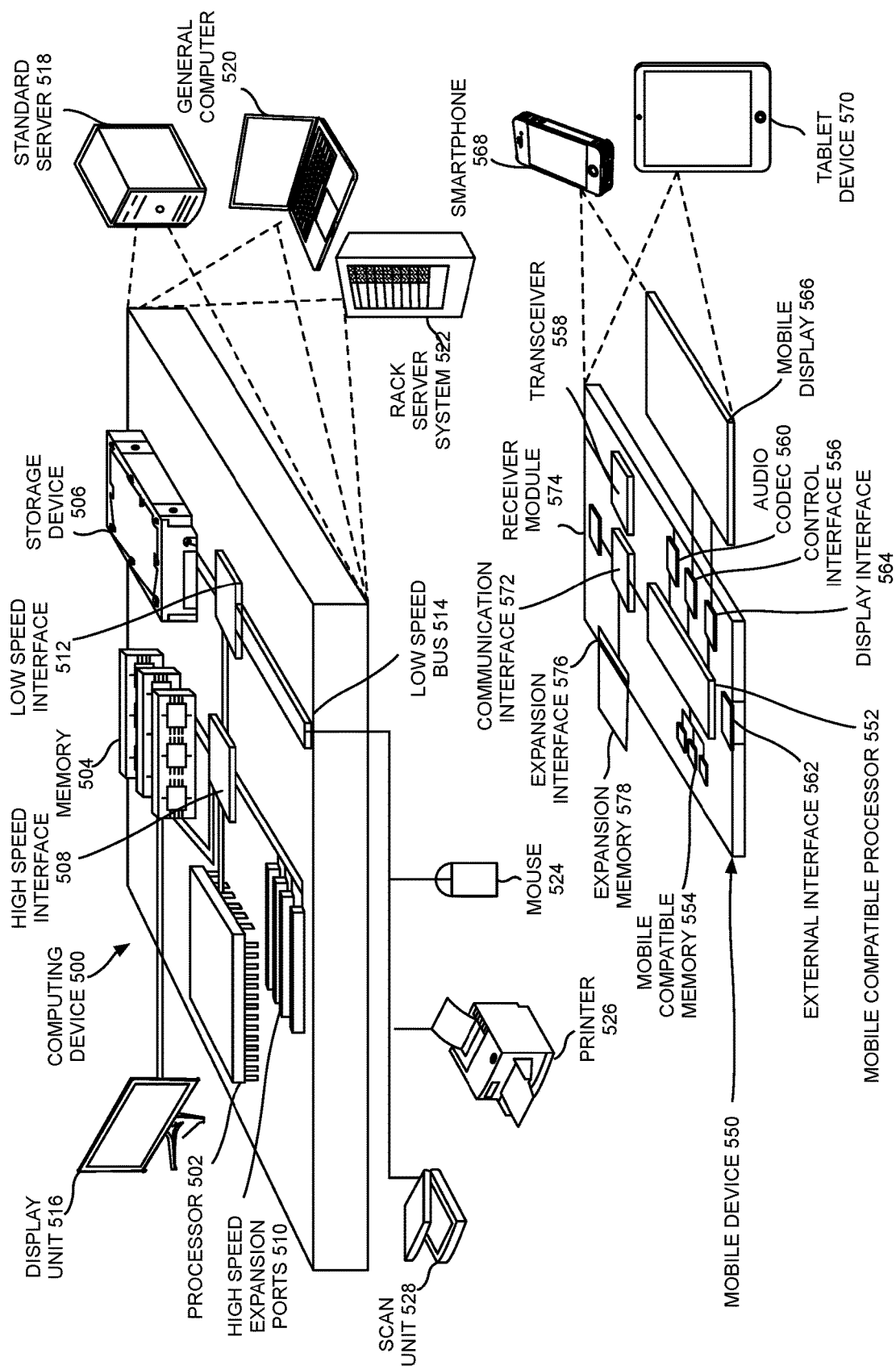
FIG. 5 is a schematic diagram of specific computing device 500 that can be used to implement the methods and systems disclosed herein.

FIG. 5 is a schematic diagram of specific computing device 500 and a specific mobile computing device 550 that can be used to perform and/or implement any of the embodiments disclosed herein. In one or more embodiments, trusted computing environment 102 of FIGS. 1-3 may be the specific computing device 500.

The specific computing device 500 may represent various forms of digital computers, such as laptops, desktops, workstations, personal digital assistants, servers, blade servers, mainframes, and/or other appropriate computers. The specific mobile computing device 550 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 500 may include a processor 502, a memory 504, a storage device 506, a high speed interface 508 coupled to the memory 504 and a plurality of high speed expansion ports 510, and a low speed interface 512 coupled to a low speed bus 514 and a storage device 506. In one embodiment, each of the components heretofore may be inter-coupled using various buses, and may be mounted on a common motherboard and/or in other manners as appropriate. The processor 502 may process instructions for execution in the specific computing device 500, including instructions stored in the memory 504 and/or on the storage device 506 to display a graphical information for a GUI on an external input/output device, such as a display unit 516 coupled to the high speed interface 508, according to one embodiment.

In other embodiments, multiple processors and/or multiple buses may be used, as appropriate, along with multiple memories and/or types of memory. Also, a plurality of specific computing device 500 may be coupled with, with each device providing portions of the necessary operations (e.g., as a server bank, a group of blade servers, and/or a multi-processor system).

The memory 504 may be coupled to the specific computing device 500. In one embodiment, the memory 504 may be a volatile memory. In another embodiment, the memory 504 may be a non-volatile memory. The memory 504 may also be another form of computer-readable medium, such as a magnetic and/or an optical disk. The storage device 506 may be capable of providing mass storage for the specific computing device 500. In one embodiment, the storage device 506 may be includes a floppy disk device, a hard disk device, an optical disk device, a tape device, a flash memory and/or other similar solid state memory device. In another embodiment, the storage device 506 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 504, the storage device 506, a memory coupled to the processor 502, and/or a propagated signal.

The high speed interface 508 may manage bandwidth-intensive operations for the specific computing device 500, while the low speed interface 512 may manage lower bandwidth-intensive operations. Such allocation of functions is exemplary only. In one embodiment, the high speed interface 508 may be coupled to the memory 504, the display unit 516 (e.g., through a graphics processor and/or an accelerator), and to the plurality of high speed expansion ports 510, which may accept various expansion cards.

In the embodiment, the low speed interface 512 may be coupled to the storage device 506 and the low speed bus 514. The low speed bus 514 may be comprised of a wired and/or wireless communication port (e.g., a Universal Serial Bus ("USB"), a Bluetooth® port, an Ethernet port, and/or a wireless Ethernet port). The low speed bus 514 may also be coupled to the scan unit 528, a printer 526, a keyboard, a mouse 524, and a networking device (e.g., a switch and/or a router) through a network adapter.

The specific computing device 500 may be implemented in a number of different forms, as shown in the figure. In one embodiment, the specific computing device 500 may be implemented as a standard server 518 and/or a group of such servers. In another embodiment, the specific computing device 500 may be implemented as part of a rack server system 522. In yet another embodiment, the specific computing device 500 may be implemented as a general computer 520 such as a laptop or desktop computer. Alternatively, a component from the specific computing device 500 may be combined with another component in a specific mobile computing device 550. In one or more embodiments, an entire system may be made up of a plurality of specific computing device 500 and/or a plurality of specific computing device 500 coupled to a plurality of specific mobile computing device 550.

In one embodiment, the specific mobile computing device 550 may include a mobile compatible processor 552, a mobile compatible memory 554, and an input/output device such as a mobile display 566, a communication interface 572, and a transceiver 558, among other components. The specific mobile computing device 550 may also be provided with a storage device, such as a microdrive or other device, to provide additional storage. In one embodiment, the components indicated heretofore are inter-coupled using various buses, and several of the components may be mounted on a common motherboard.

The mobile compatible processor 552 may execute instructions in the specific mobile computing device 550, including instructions stored in the mobile compatible memory 554. The mobile compatible processor 552 may be implemented as a chipset of chips that include separate and multiple analog and digital processors. The mobile compatible processor 552 may provide, for example, for coordination of the other components of the specific mobile computing device 550, such as control of user interfaces, applications run by the specific mobile computing device 550, and wireless communication by the specific mobile computing device 550.

The mobile compatible processor 552 may communicate with a user through the control interface 556 and the display interface 564 coupled to a mobile display 566. In one embodiment, the mobile display 566 may be a Thin-Film-Transistor Liquid Crystal Display ("TFT LCD"), an Organic Light Emitting Diode ("OLED") display, and another appropriate display technology. The display interface 564 may comprise appropriate circuitry for driving the mobile display 566 to present graphical and other information to a user. The control interface 556 may receive commands from a user and convert them for submission to the mobile compatible processor 552.

In addition, an external interface 562 may be provide in communication with the mobile compatible processor 552, so as to enable near area communication of the specific mobile computing device 550 with other devices. External interface 562 may provide, for example, for wired communication in some embodiments, or for wireless communication in other embodiments, and multiple interfaces may also be used.

The mobile compatible memory 554 may be coupled to the specific mobile computing device 550. The mobile compatible memory 554 may be implemented as a volatile memory and a non-volatile memory. The expansion memory 578 may also be coupled to the specific mobile computing device 550 through the expansion interface 576, which may comprise, for example, a Single In Line Memory Module ("SIMM") card interface. The expansion memory 578 may provide extra storage space for the specific mobile computing device 550, or may also store an application or other information for the specific mobile computing device 550.

Specifically, the expansion memory 578 may comprise instructions to carry out the processes described above. The expansion memory 578 may also comprise secure information. For example, the expansion memory 578 may be provided as a security module for the specific mobile computing device 550, and may be programmed with instructions that permit secure use of the specific mobile computing device 550. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 554, the expansion memory 578, a memory coupled to the mobile compatible processor 552, and a propagated signal that may be received, for example, over the transceiver 558 and/or the external interface 562.

The specific mobile computing device 550 may communicate wirelessly through the communication interface 572, which may be comprised of a digital signal processing circuitry. The communication interface 572 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 558 (e.g., radio-frequency transceiver). In addition, short-range communication may occur, such as using a Bluetooth®, Wi-Fi, and/or other such transceiver. In addition, a GPS ("Global Positioning System") receiver module 574 may provide additional navigation-related and location-related wireless data to the specific mobile computing device 550, which may be used as appropriate by a software application running on the specific mobile computing device 550.

The specific mobile computing device 550 may also communicate audibly using an audio codec 560, which may receive spoken information from a user and convert it to usable digital information. The audio codec 560 may likewise generate audible sound for a user, such as through a speaker (e.g., in a handset smartphone of the specific mobile computing device 550). Such a sound may comprise a sound from a voice telephone call, a recorded sound (e.g., a voice message, a music files, etc.) and may also include a sound generated by an application operating on the specific mobile computing device 550.

The specific mobile computing device 550 may be implemented in a number of different forms, as shown in the figure. In one embodiment, the specific mobile computing device 550 may be implemented as a smartphone 568. In another embodiment, the specific mobile computing device 550 may be implemented as a personal digital assistant ("PDA"). In yet another embodiment, the specific mobile computing device, 550 may be implemented as a tablet device 570.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other hardware, computing environments, data types, tags, and operations could be intermixed or substituted with those provided. In places where the description above refers to particular embodiments of system and method for on-demand data cleansing, it should be readily apparent that a number of modifications may be made without departing from the spirit thereof and that these embodiments and implementations may be applied to other to data cleansing technologies as well. Accordingly, the disclosed subject matter is intended to embrace all such alterations, modifications and variations that fall within the spirit and scope of the disclosure and the knowledge of one of ordinary skill in the art.

What is claimed is:

1. A system for on-demand data cleansing, comprising:
a processor;
a memory communicatively coupled to the processor and comprising a data object having a plurality of data fields, each field having a tag and a value;
a cleansing module stored in the memory and executed by the processor, the cleansing module comprising a library having a plurality of tag-operation pairs, each tag-operation pair comprising a library tag and an associated operation, the cleansing module configured to, for each data field of the plurality of data fields:
look up the tag of the data field among the library tags of the plurality of tag-operation pairs of the library; and
execute the operation paired with the matching library tag on the value of the data field such that the value of the data field is modified to comply with a policy while it is stored in the memory.

2. The system of claim 1, wherein executing the operation on the value of the data field comprises overwriting at least some of the value of the data field, replacing the value of the data field—with a reformatted value, or replacing the value of the data field with a new value based on the value of the data field yet having less specificity.

3. The system of claim 1, wherein the policy is HIPAA.

4. The system of claim 1, wherein the library is a HIPAA library and the plurality of tag-operation pairs are configured to ensure the data object complies with HIPAA,
wherein the cleansing module further comprises a custom library stored in the memory, the custom library comprising a plurality of custom tag-operation pairs, and
wherein the custom library is configured to supersede the HIPAA library for at least one of the plurality of data fields.

5. The system of claim 1, wherein the cleansing module comprises at least one additional library such that the cleansing module comprises a plurality of libraries, each library implementing a different policy regarding data, and
wherein the cleansing module is configured to select one of the plurality of libraries based on at least one of an identity of a party requesting data contained in the data object, a geolocation of an IP address associated with a request for the data of the data object, an identity of a source of the data contained in the data object, and a nature of the data of the data object.

6. The system of claim 1, wherein the library is configured to be modified by modifying an operation of the plurality of tag-operation pairs.

7. A method for on-demand data cleansing, comprising:
storing a data object within a memory, the data object comprising a plurality of data fields, each data field having a tag and a value;
for each data field of the plurality of data fields of the data object:
looking up the tag of the data field within a library stored in the memory, the library comprising a plurality of tag-operation pairs each having a library tag and an associated operation;
finding the tag-operation pair having a library tag that matches the tag of the data field; and
executing the operation stored in the library and paired with the matching library tag on the value of the data field such that the value of the data field is modified to comply with a policy while the value is stored in the memory.

8. The method of claim 7, wherein executing the operation on the value of the data field comprises overwriting at least some of the value of the data field, replacing the value of the data field—with a reformatted value, or replacing the value of the data field with a new value based on the valued of the data field yet having less specificity.

9. The method of claim 7, wherein the policy is HIPAA.

10. The method of claim 7, wherein the library is a HIPAA library and the plurality of tag-operation pairs are configured to ensure the data object complies with HIPAA, the method further comprising, for at least one of the plurality of data fields of the data object:
looking up the tag of the data field within a custom library stored in the memory, the custom library different than the HIPAA library and comprising a plurality of custom tag-operation pairs;
finding the custom tag-operation pair having a library tag that matches the tag of the data field; and
executing a custom operation stored in the custom library and paired with the matching library tag on the value of the data field, such that the custom library is configured to supersede the HIPAA library for the at least one of the plurality of data fields of the data object.

11. The method of claim 7, further comprising selecting the library from a plurality of libraries stored in the memory, each library implementing a different policy regarding data, wherein the selecting is based on at least one of an identity of a party requesting data contained in the data object, a geolocation of an IP address associated with a request for the data of the data object, an identity of a source of the data contained in the data object, and a nature of the data of the data object.

12. The method of claim 7, further comprising modifying an operation of the plurality of tag-operation pairs.

13. A method for on-demand data cleansing, comprising:
receiving data from an authorized party at a trusted computing environment;
storing the data in a memory of the trusted computing environment as a data object having a plurality of data fields, each field having a tag and a value;
detecting a trigger event, wherein the trigger event is a request for the data from a requesting entity;
cleansing the data by, for each data field of the plurality of data fields of the object:
looking up the tag of the data field within a library stored in the memory, the library comprising a plurality of tag-operation pairs each having a library tag and an associated operation;
finding the tag-operation pair having a library tag that matches the tag of the data field; and executing the operation stored in the library and paired with the matching library tag on the value of the data field such that the value of the data field is modified while the value is stored in the memory;

sending the cleansed data to the requesting entity.

14. The method of claim 13, wherein the data is received with field tags already in place.

15. The method of claim 13, further comprising tagging the data after the data is received.

16. The method of claim 13, wherein the data comprises sensitive health data.

17. The method of claim 13, wherein the data comprises sensitive personal data.

18. The method of claim 13, wherein executing the operation modifies the value of the data field to comply with HIPAA.

19. The method of claim 13, wherein the data comprises financial data, research data, commercial data, personal activity data, or demographic data.

20. The method of claim 13, wherein executing the operation modifies the value of the data field to provide a level of access to the data based on a price paid by the requesting entity.

\* \* \* \* \*